Aug. 1, 1967  C. E. LINKOUS  3,333,330
METHODS FOR EFFECTING COIL-PLACING OPERATIONS ON ELECTRICAL
COILS IN COIL-ACCOMMODATING MEMBERS
Filed Nov. 30, 1964  7 Sheets-Sheet 3

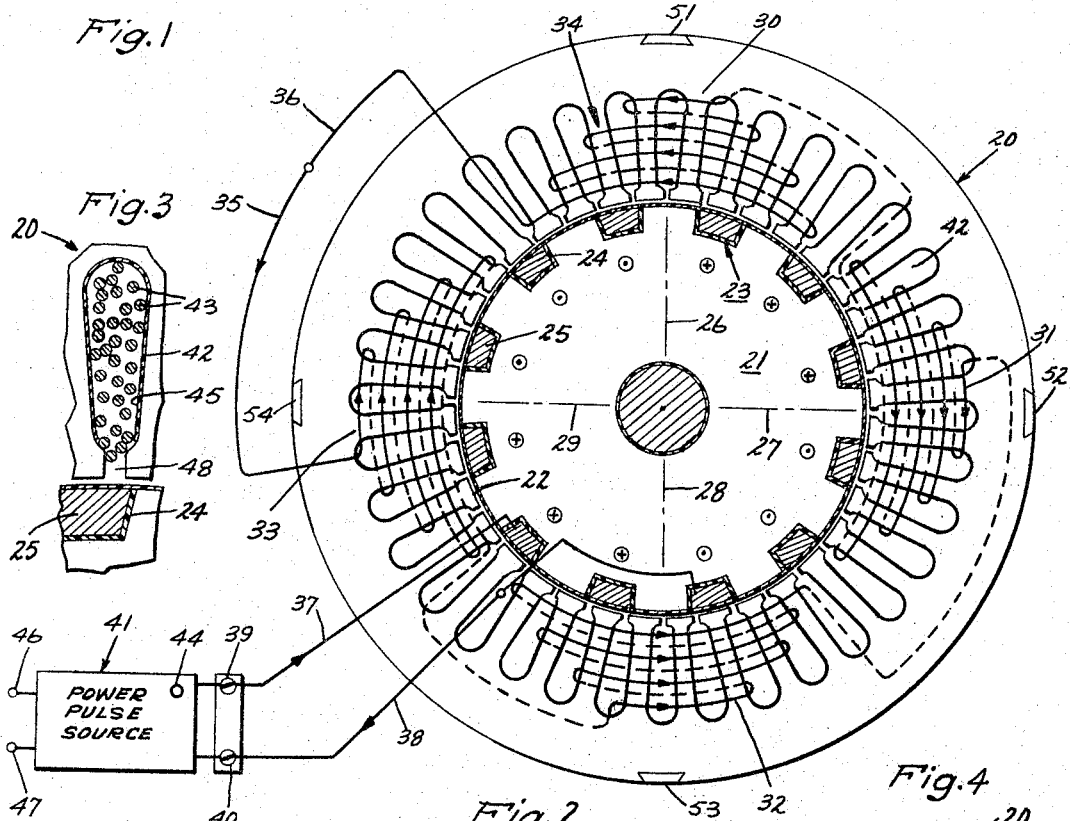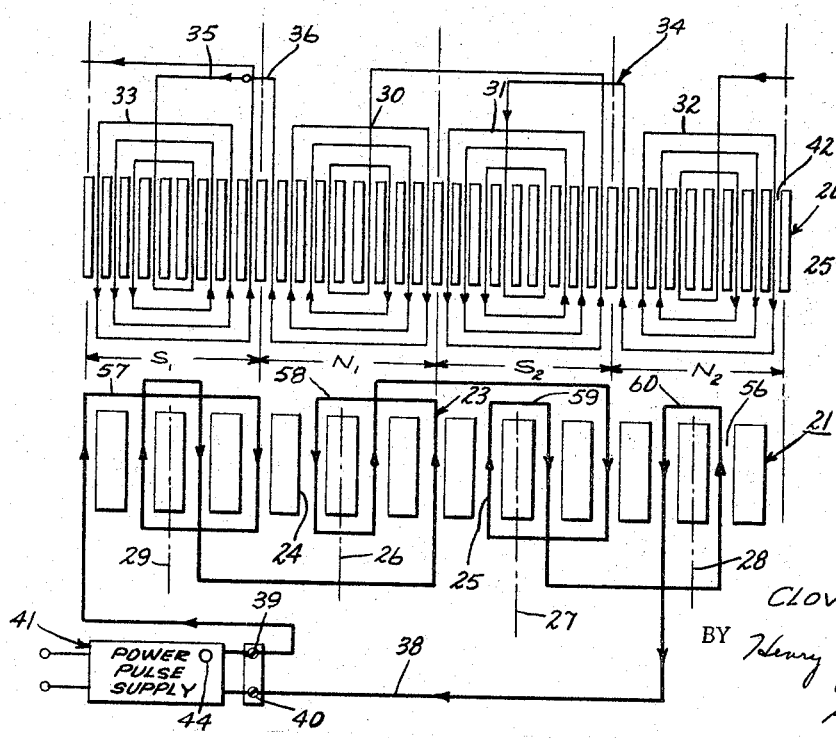

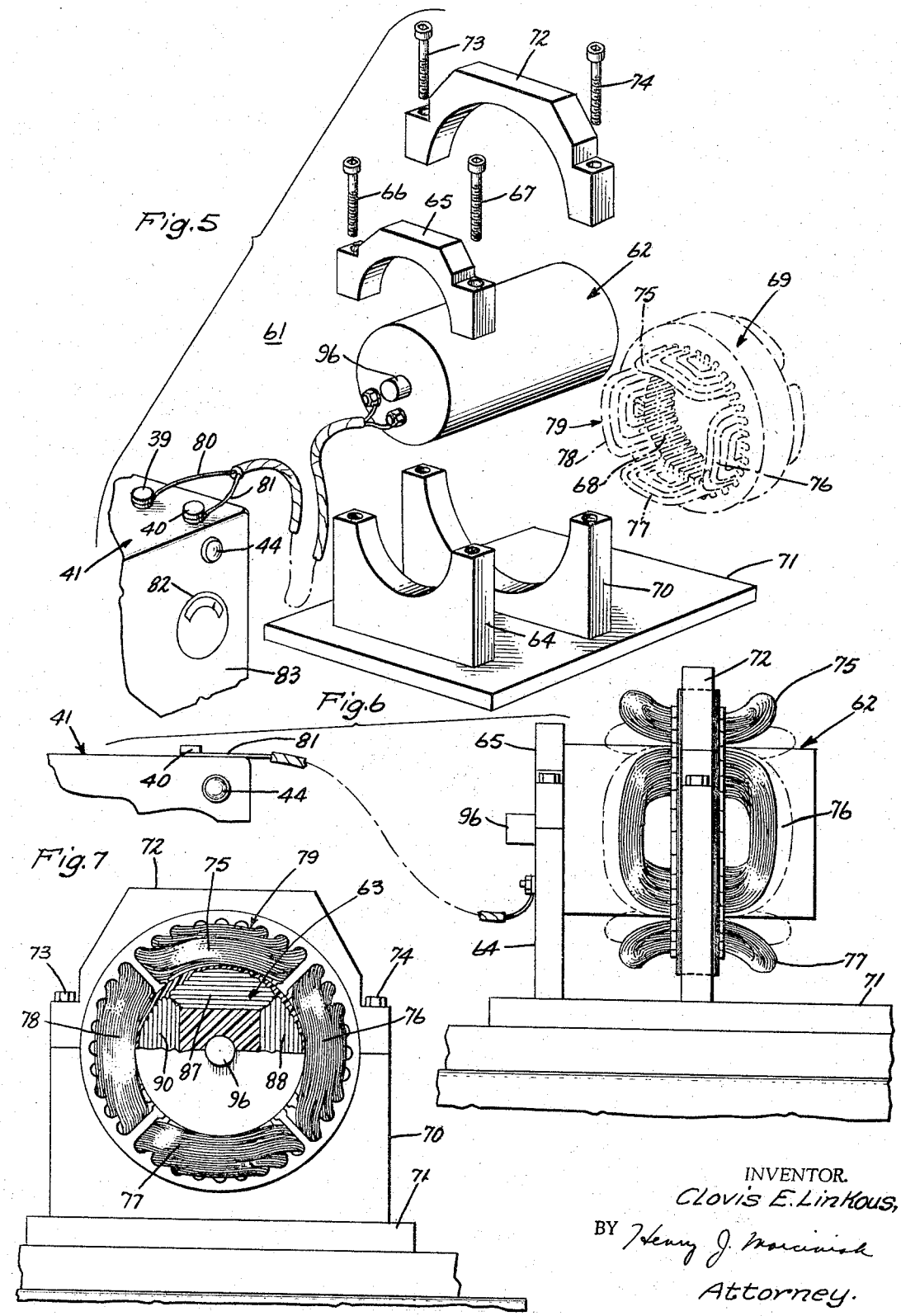

INVENTOR.
Clovis E. Linkous,
BY *Henry J. Marinich*
Attorney.

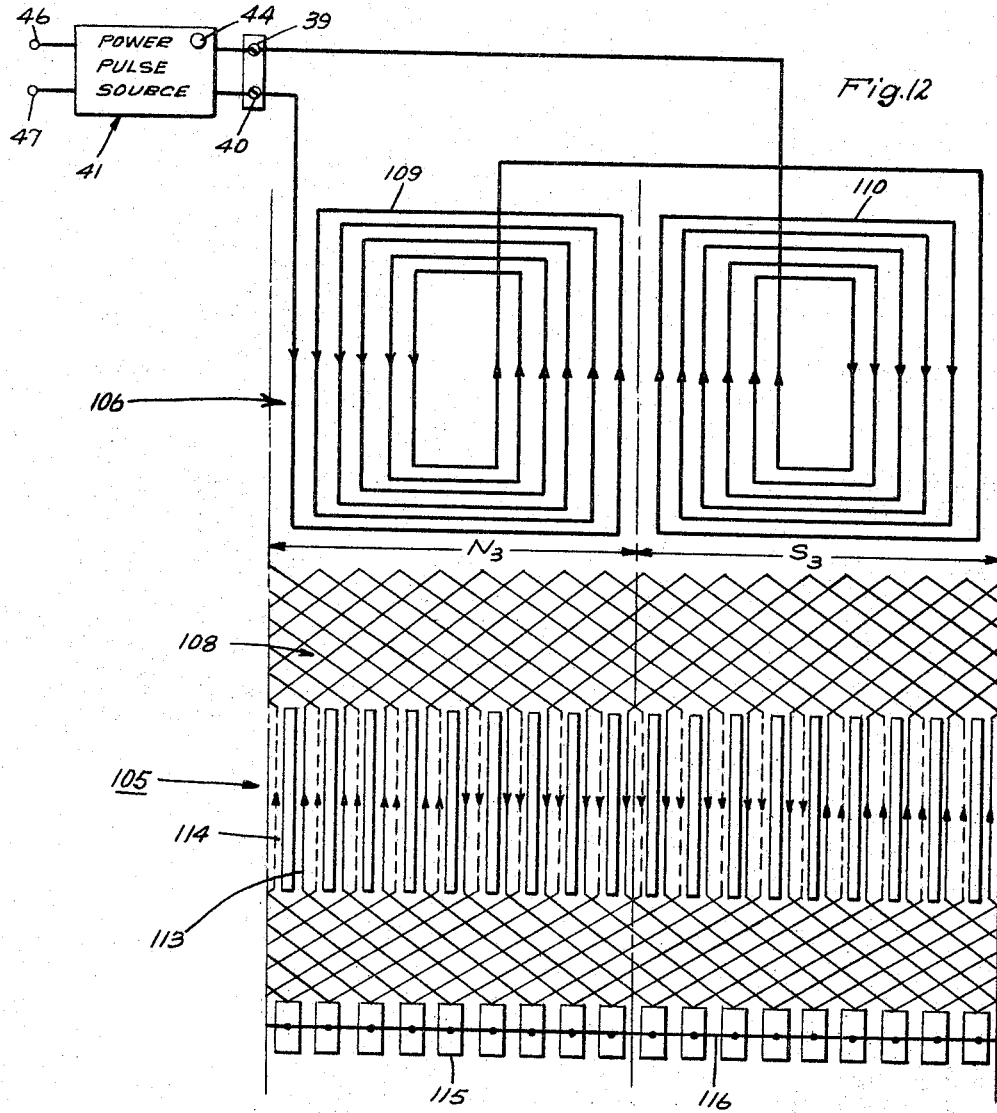

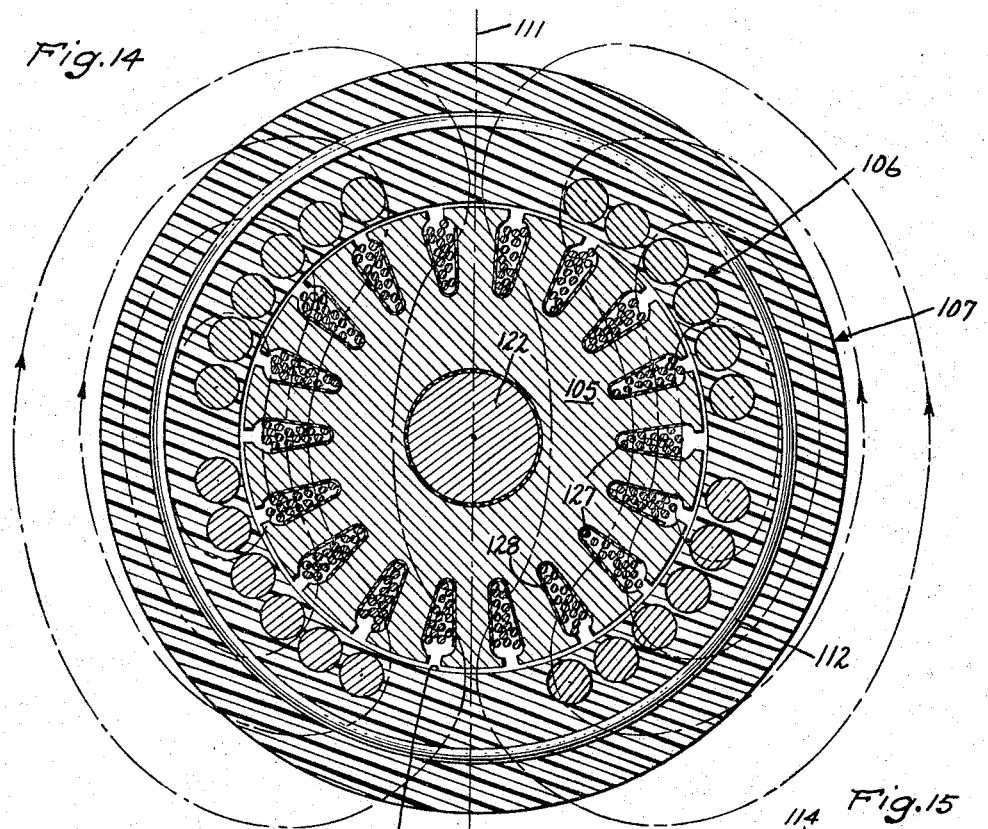
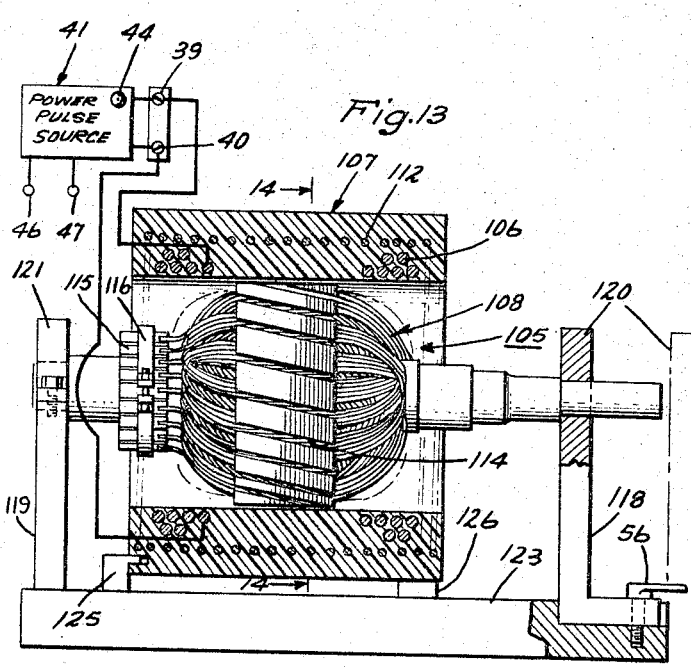
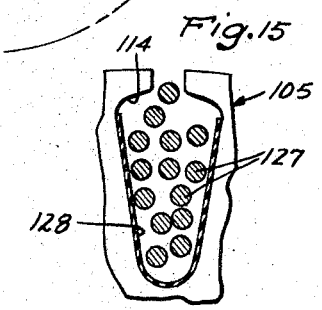
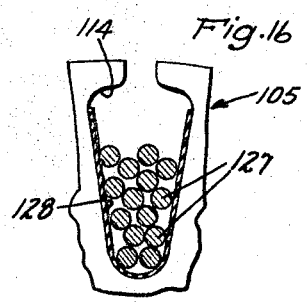

United States Patent Office 3,333,330
Patented Aug. 1, 1967

3,333,330
METHODS FOR EFFECTING COIL-PLACING OPERATIONS ON ELECTRICAL COILS IN COIL-ACCOMMODATING MEMBERS
Clovis E. Linkous, Fort Wayne, Ind., assignor to General Electric Company, a corporation of New York
Filed Nov. 30, 1964, Ser. No. 414,825
9 Claims. (Cl. 29—596)

This invention relates generally to methods for effecting various coil-placing operations required in the manufacture of inductive devices. More particularly, the present invention relates to such methods and as are suitable for carrying out coil-placing operations required in the manufacture of dynamoelectric machine cores used in small fractional horsepower motors.

After the excitation winding coils of a small fractional horsepower motor have been initially inserted in the coil-accommodating slots of the stator, it is highly desirable, if not necessary, in many types of motors, to push back the end turn portions of the coils toward the end faces of the stator and to force the individual conductors of the coil side portions toward the bottom of the slots. It will be appreciated that after insertion of the coils during the process of manufacture, the end turn portions of these coils generally project axially beyond the end faces of the core. For example, in a two-pole fractional horsepower induction motor, it is required that the end turn portions of the main winding coils be pushed back away from the bore toward the end faces of the core for a number of reasons. Unless the end turn portions are sufficiently pushed back, the axially extending end turn portions would obstruct the entrance to the stator bore and would increase the overall axial dimensions of the stator.

Also, in many types of fractional horsepower motors, it is desirable after the coil insertion process is completed, to force back the coil side portions of the main winding coils toward the bottom of the slots. The greater degree of compaction achieved by forcing back the coil side portions, the more effectively can the conductor material and slot space be utilized. Where the coil side portions of other auxiliary windings are to be placed in coil-accommodating slots containing the main winding, the coil side portions of the main winding must be forced back toward the bottom of the slots to provide sufficient space in the slots to accommodate the coil side portions of an auxiliary winding such as the start winding.

In the mass production of fractional horsepower motors, it is a well established practice to effect coil-placing operations, such as pushing back end turn portions and forcing back the coil side portions toward the bottom of the slots, by the employment of various mechanical techniques. These mechanical techniques generally involve the use of mechanical devices that are brought in physical contact with the end turn and coil side portions. By means of the force applied to the coils by the mechanical device the coil-placing operations are carried out.

A disadvantage of such conventional techniques is that the physical contact between the mechanical device and the coil has a tendency to damage the conductor insulation. Also, the execution of these coil-placing operations by mechanical techniques has required the use of inherently expensive manufacturing machinery. Because of possible damage to conductor wire insulation, mechanical techniques impose a limit on the amount of conductor material that can be effectively and economically utilized in a given slot volume.

Accordingly, a general object of the present invention is the provision of an improved method for effecting a coil-placing operation on at least a portion of an electrical coil disposed in a coil-accommodating structure such as a magnetic core.

It is a more specific object of the present invention to provide an improved method for effecting a desired placement of at least a portion of an electrical coil that does not require the use of a mechanical device to engage the coil.

Another object of the present invention is the provision of an improved method for effecting a desired placement of one or more coils with respect to a core wherein the core material can be more effectively utilized.

It is still another object of the present invention to provide an improved method for pushing back the end turn portions of one or more electrical coils accommodated in slots of a magnetic core toward the end faces of the core without damaging the conductor insulation or the turns of the coil.

A further object of the present invention is the provision of an improved method for effecting various coil-placing operations in the manufacture of dynamoelectric machines, such as small fractional horsepower motors, that overcome some of the disadvantages associated with conventional mechanical techniques for effecting these operations.

In accordance with one form of my invention I have provided an improved metehod for effecting a desired placement of a portion of one or more electrical coils relative to a coil or winding accommodating member. The desired placement, which may include pushing back coil end turn portions, forcing back coil side portions into the winding accommodating member, compacting the conductors of the coil, or other coil-placing operations, is accomplished by supporting a primary winding in nonmovable relation with respect to the winding accommodating member and in transformer relationship with the coil or coils to be manipulated, and injecting into the primary winding at least one high electric power pulse of a preselected magnitude. A closed path for induced current flow in the coil or coils is provided by short circuiting the coil or coils and the electromagnetic forces resulting from the interaction of the currents and magnetic field produced by the high power pulse effectively act on portions of the coil or coils to effect the desired placement relative to the coil-accommodating member.

By way of one exemplification, the principles of my invention are applied to effectuate the coil-placing operations required in the manufacture of a dynamoelectric machine core. Such a core is usually formed with a polarity of angularly spaced slots accommodating the coil side portions of the coils, groups of the coils of an excitation winding being distributed in the slots to provide an even number of magnetic poles having a polar relationship wherein adjacent magnetic poles are in opposing relation. Thus, the coils of a coil group defining one magnetic pole are arranged to provide a current flow in a clockwise direction, and the coils of a coil group defining an adjacent magnetic pole are arranged to provide a current flow in a counterclockwise direction.

In applications where it is desirable to push back all of the coils simultaneously, a primary winding is supported in fixed relation relative to the dynamoelectric core and placed in transformer relationship with the coils of the excitation winding. This primary winding includes a number of coil groups defining poles simulating the polar relationship of the magnetic poles defined by the excitation winding. That is, the coils of one primary winding coil group define a magnetic pole that is in polar opposition to the magnetic pole defined by the adjacent coil group. With the excitation winding short-circuited to provide a closed path for induced current flow therein, at least one high power pulse of a preselected magnitude is injected in the primary winding to cause a surge of current flow therein and also to cause a surge of induced current flow in the coils of the excitation winding thereby to establish a magnetic field. A push back of the coils of the main winding is achieved by the electromagnetic forces acting thereon and resulting from the interection of currents and magnetic field produced by the high power pulse.

Where it is desired or necessary only to effect a coil-placing operation on a single coil or coil group defining a magnetic pole, it will be appreciated that the primary winding need to include only a single core or coil group simulating the coil or coil group to be manipulated. Preferably, the magnetic pole defined by the primary winding should be angularly and axially aligned with the magnetic pole defined by the coil or coil group to be manipulated. The desired coil-placing operations are then effected by injecting one or more power pulses of preselected magnitude into the coil or coil group of the primary winding.

With the improved method of the present invention it is possible to carry out various coil-placing operations on electrical coils by means of electromagnetic forces acting thereon without causing unduly high voltage stresses between the conductors of the coils and without the need for mechanical members to physically engage the coils. An important advantage achieved by the practive of the present invention is that it is possible to economically and effectively compact coil side portions and thereby increase the amount of conductor material per unit slot volume. Also, the coil end turn portions can be readily pushed back toward the end faces of a stator.

The subject matter which I regard as my invention is particularly pointed and distinctly claimed in the concluding portion of the specification. The invention itself, however, together with further objects and advantages thereof, may be best understood by reference to the following description taken in conjunction with the accompanying drawings in which:

FIGURE 1 is an end view of a stator core and a coil-accommodating member carrying a primary winding disposed in transformer relationship with the coils of an excitation winding disposed in the slots of the stator core, the primary winding being connected in circuit with a power pulse source and the coils of the main winding being short-circuited in accordance with one form of the invention;

FIGURE 2 is a schematic circuit diagram of a polar development of the excitation winding of the stator shown in FIGURE 1 with the primary winding of the coil-accommodating member of FIGURE 1 being illustrated along side of the excitation winding to show the polar relationship, the schematic diagram illustrating the principles of the invention as applied to a four-pole stator of a dynamoelectric machine;

FIGURE 3 is an enlarged fragmentary view of one of the coil-accommodating slots of the stator shown in FIGURE 1, the view illustrating the distribution of the conductors after the initial insertion of a coil side portion into a slot;

FIGURE 4 is an enlarged fragmentary view of a coil-accommodating slot corresponding to the view shown in FIGURE 3, the view of FIGURE 4 illustrating the push back of the conductors after one or more high power pulses have been injected in the primary winding;

FIGURE 5 is a perspective view of the apparatus used in the practice of the invention to support the primary winding and stator core while a high power pulse is injected into the primary winding from a power pulse source, only a fragmentary view of the power pulse source being illustrated;

FIGURE 6 is a side view of the apparatus and stator core shown in FIGURE 5 with the end turn portions of the excitation winding shown;

FIGURE 7 is an end view of the apparatus and stator core with the coil-accommodating member being cut-away to show the relative arrangement of the end turn portions of the primary winding, the excitation winding being shown with its end turn portions as they appear after insertion;

FIGURE 12 is a schematic polar development diagram of an armature winding and a primary winding simulating the magnetic poles produced by the armature winding in accordance with another form of the present invention;

FIGURE 13 is a side view of an armature, a sectionalized view of its associated coil-accommodating member, and an apparatus used to hold a primary winding in non-movable relation with respect to the armature;

FIGURE 14 is an enlarged sectional view of the armature and coil-accommodating member taken generally along line 14—14 in FIGURE 13, the section through the coil-accommodating member being shown in full;

FIGURE 15 is an enlarged fragmentary view of one of the slots of the armature shown in FIGURE 14, illustrating the distribution of the individual conductors after initial insertion of a coil side portion but before a coil-placing operation in accordance with the present invention is carried out;

Figure 17:
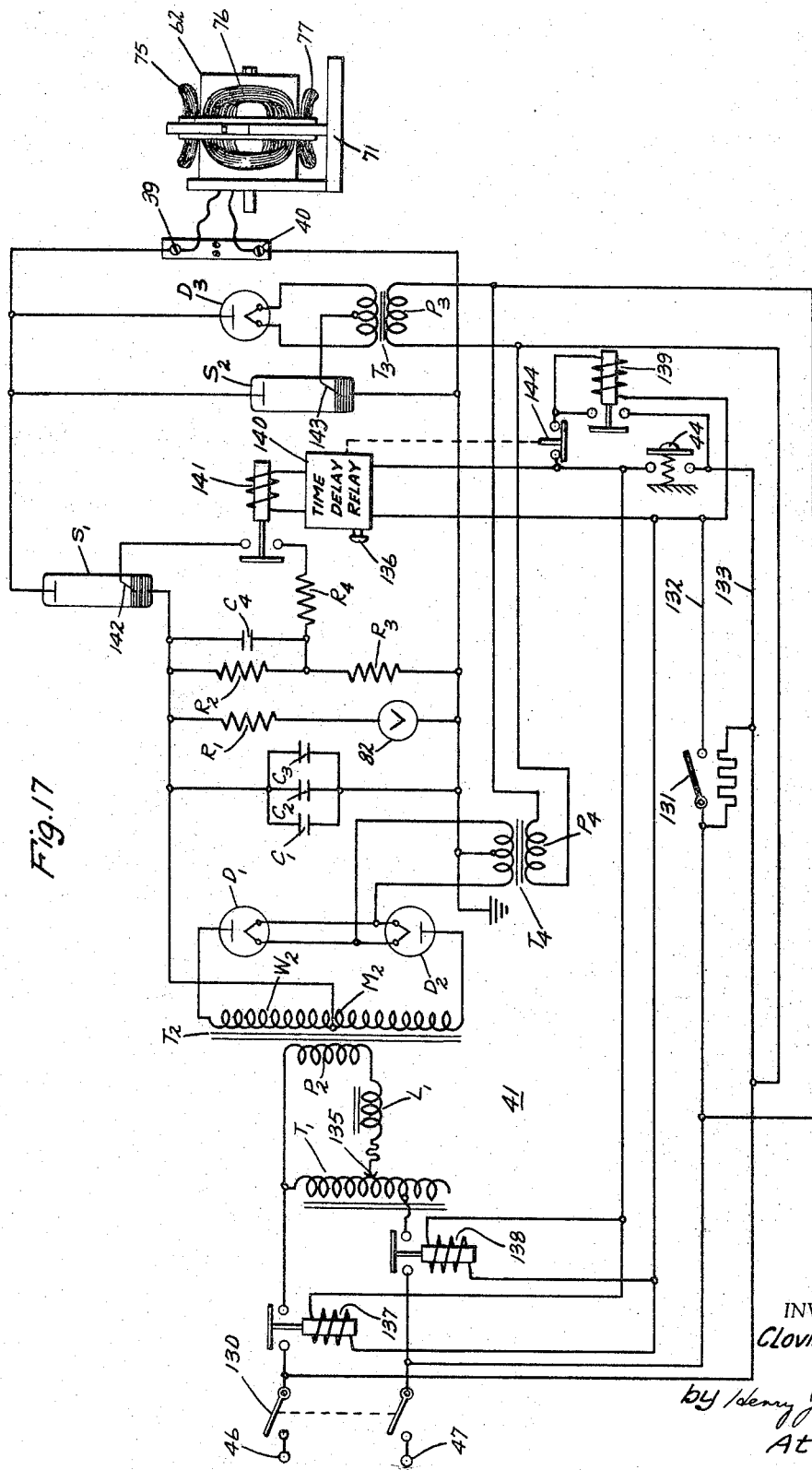

FIGURE 16 is an enlarged fragmentary view of a slot corresponding to the view shown in FIGURE 15, the view of FIGURE 16 illustrating the push back of the coil conductors toward the bottom of the slot as achieved in accordance with one form of the present invention; and FIGURE 17 is a schematic circuit diagram of a power pulse source adapted for connection to an alternating current supply for producing high power pulses.

Having more specific reference now to FIGURES 1 through 4, I have illustrated therein various aspects of one form of my invention as applied to a four-pole stator core 20 of a dynamoelectric machine. In FIGURE 1 I have shown a coil-accommodating member or fixture 21 disposed in the central bore 22 of the stator core 20 and carrying a primary winding 23 in fixed relation with respect to the stator core 20. The coil-accommodating member 21 is formed with twelve slots 24 accommodating the primary winding 23. The primary winding 23 includes twelve insulated coil side conductors 25 arranged to define magnetic poles essentially aligned radially with the pole axes 26, 27, 28 and 29, and simulating the magnetic poles defined by coil groups 30, 31, 32 and 33 of an excitation winding 34. The excitation winding 34 is short-circuited by joining the leads 35 and 36 to provide a closed path for induced current flow in the excitation winding 34. In particular, it will be noted that the primary winding 23 is connected by leads 37, 38 to connector terminals 39 and 40 of a power pulse source 41.

As is shown in FIGURE 3, after the coils are initially inserted into a slot 42, the conductors 43 of a coil side portion are loosely and movably disposed in the slot 42, and a coil-placing operation is required to force the conductors 43 back toward the bottom (radially outward) of the slot 42. In the illustrated exemplification of my invention the conductors 43 are forced back by a method which includes supporting the primary winding 23 by means of the coil-accommodating member 21 in fixed relation with respect to the stator core 20 and in transformer relationship with the excitation winding 34. With the excitation winding 34 short-circuited to provide a path for induced current flow therein, a high power pulse is injected into the primary winding by depressing the push button 44 to produce a surge of current flow in the primary winding 23 and induce a surge of current flow in the coil groups 30, 31, 32 and 33 of the excitation winding 34 thereby to establish a varying magnetic field. As a result of the interaction of the currents and magnetic field produced by the high power pulse, electromagnetic forces are caused to act on the conductors 43 of the coil side portions of the excitation winding 34 to push back the conductors 43 toward the bottom of the slot 42 against the insulating slot liner 45 as is seen in FIGURE 4. Also, with the polar development arrangement as shown in FIGURE 2, it is possible to effect a push back of the coil end turn portions of the excitation winding 34.

The power pulse source 41 used in the exemplification of my invention has a pair of terminals 46, 47 adapted for connection to alternating current supply and is capable of supplying a high power pulse of 4922 joules at 4000 volts. The operation of the power pulse source 41 is initiated by depressing the push button 44. As will hereinafter be more fully explained, the high power pulse of predetermined magnitude is provided by charging a capacitor bank to a selected voltage level and after a predetermined interval the capacitor bank is discharged through the primary winding 23 connected across the terminal connectors 39 and 40.

In the practice of the present invention, it may be desirable in certain applications to utilize a succession of high power pulses to effect the desired coil-placing operations. In the stator core 20 for a small fractional horsepower motor, it is possible that conductors 43 near the slot entrance 48 may not be sufficiently insulated from ground. Preferably, a first high power pulse of relatively lower magnitude may be applied across the primary winding 23 to insure that the conductors near the slot entrance 48 are pushed back. A second high power pulse may then be applied across the primary winding 23 of sufficient magnitude to effect the desired degree of compaction of the conductors 43.

The force level, which must be produced on the conductors 43 to effect a push-back of the end turns or other coil-placing operations, will depend on a number of factors including the wire size, the type of wire material, the geometry of the coils, and the coupling factor between the primary winding and the coils. Also, it will be appreciated that the amount of energy required to produce the desired force level will depend upon certain circuit parameters. The circuit which includes the capacitor bank and the primary winding is essentially a RLC circuit, and the magnitude of these parameters in the circuits used in the various exemplifications of the invention was such that a damped oscillatory current was produced in the primary winding when the capacitor bank was discharged. In a given application it is important to fix the point in time at which the first peak in the oscillatory wave is reached so that overheating of the winding does not occur and so that voltage stress is not excessive. The time required for the current to reach its first peak is a function of the inductance of the circuit, the capacitance of the capacitors in the capacitor bank, and the coefficient of coupling between the primary winding 23 and the excitation winding 34. If the number of turns of the primary winding 23 is increased, the point in time at which the first current peak occurs is delayed. It was found that by delaying this current peak results in a greater dissipation of the energy as heat and advancing the current peak by reducing the number of turns of the primary winding 23 results in a greater voltage stress or volts per turn. It is desirable therefore to select suitable circuit parameters that will provide the desired force level without unduly subjecting the primary winding 23 to a high voltage stress and without causing the winding 23 to overheat. In actual applications of my invention the magnitude of the high power pulse and the number of power pulses to be used was determined by trying power pulses of varying magnitudes, and selecting the minimum magnitude that would accomplish the desired placement of the excitation winding.

With a fixture having a primary winding with four turns per coil and with a capacitor bank having a capacitance of 630 microfarads, it was found that the peak current in the primary winding of the fixture occurred approximately 100 microseconds after the discharge of the capacitor bank was initiated from a 4300 volt level. The peak power input after 45 microseconds was 92,000,000 watts. Despite this extremely high power input, the temperature rise as determined by touching the primary winding was barely perceptible because of the short duration of the pulse.

In order to more fully explain how the invention as described above may be carried out in actual practice, I will now fully describe the stator core 20 and winding arrangement used in the exemplification of the invention shown in FIGURES 1 and 2. The stator core 20 is built up of a preselected number of laminations punched from relatively thin magnetic sheet material, such as common iron. The laminations are conventionally secured together in juxtaposition by four spaced apart keys 51, 52, 53 and 54 frictionally engaged in notches formed at spaced locations near the outer periphery of the stator core 20. The stator core 20 is formed with thirty-six coil slots 42 accommodating the excitation winding 34.

The excitation winding 34 is comprised of four coil groups 30, 31, 32 and 33 arranged on the stator core 30 to define four magnetic poles $N_1$, $S_2$, $N_2$, $S_1$ respectively. Each pole is formed by a group of four concentric coils wound to a span in effect two, four, six and eight tooth sections, the coils having 18, 28, 36 and 42 turns respectively.

Fixture 21 is formed of a stack of laminations of thin magnetic sheet material with slots 24 accommodating the conductors 25 of the primary winding 23. To indicate the direction of current flow through the conductors 25 I have placed alongside of the conductors 25 in the view of FIGURE 1, the conventional symbol $\oplus$ to denote that the direction of current flow is downward through the drawing and the symbol $\odot$ to denote that the direction of the current flow is outwardly of the drawing.

Having more specific reference to FIGURE 2 I have illustrated therein how conductors 25 of the primary winding 23 are arranged to provide magnetic poles that simulate the magnetic poles $N_1$, $S_2$, $N_2$ and $S_1$ defined by the coil groups 30, 31, 32 and 33 of the excitation winding 34. Preferably, the magnetic poles of the primary winding 23 span essentially the same number of electrical degrees as the magnetic poles of the excitation winding 34. Also, in the practice of the present invention it is preferred to provide primary winding poles that are both in radial and axial alignment with the excitation winding poles.

As will be seen in FIGURE 2, when a power pulse is injected into the primary winding 23 the current proceeds in a clockwise direction through coil group 57 that simulates magnetic pole $S_1$. In coil group 58 that simulates the magnetic pole $N_1$, it will be noted that the current flows in a counterclockwise direction. Similarly, the conductors 56 of coil group 59 are arranged to simulate the magnetic pole $S_2$ while the conductors of coil group 60 are arranged to simulate magnetic pole $N_2$. In the winding arrangement as exemplified in FIGURE 2, the magnetic poles of the excitation winding 34 and the primary winding 23 are coincident and of the same polarity. When a high power pulse is injected into the primary winding 23, electromagnetic forces resulting from the interaction of the currents and a varying magnetic field produced by one or more high power pulse act on the coil side and end turn portions of the excitation winding 34 to effect the desired placement of the winding 34 relative to the core 20.

Having more specific reference now to FIGURES 5, 6 and 7, I will now more fully describe an apparatus 61 used in carrying out one exemplification of my invention. A winding accommodating member 62 encasing a primary winding 63 (see FIGURE 7) is rigidly held in a cradle bracket 64 by a clamping element 65 fastened to the cradle bracket 64 by screws 66 and 67 and is centered within the bore 68 of a stator core 69. Also, the stator core 69 is supported in cradle bracket 70 mounted on a base plate 71 and is nonmovably held in the bracket 70 by a clamping element 72 secured to the cradle bracket 70 by means of a pair of screws 73 and 74.

As is seen in the cutaway view of FIGURE 7, the coil groups 87, 88 and 90 of the primary winding 63 are held in fixed or nonmovable relation with respect to the stator core 69 and are inductively coupled with the coil groups 75, 76, 77 and 78 of the excitation winding 79. As is shown in FIGURE 5, the winding accommodating member 62 is connected by the electrical leads 80, 81 to the connector terminals 39, 40 of the power pulse source 41. A voltmeter 82 and push button 44 are shown at the front of the cabinet 83 housing the power pulse source 41. The voltmeter 82 provides an indication of the voltage level to which the capacitor bank is charged.

In FIGURE 6 I have shown the general position of the end turn portions of the coil groups 75, 76 and 77 after the coil-placing operations have been carried out in accordance with the principles of the present invention. The general position of the end turn portions, as they appear before the high power pulse is injected in the primary winding 63, is shown in the end view of FIGURE 7 and in phantom outline in FIGURE 6.

Figure 8:
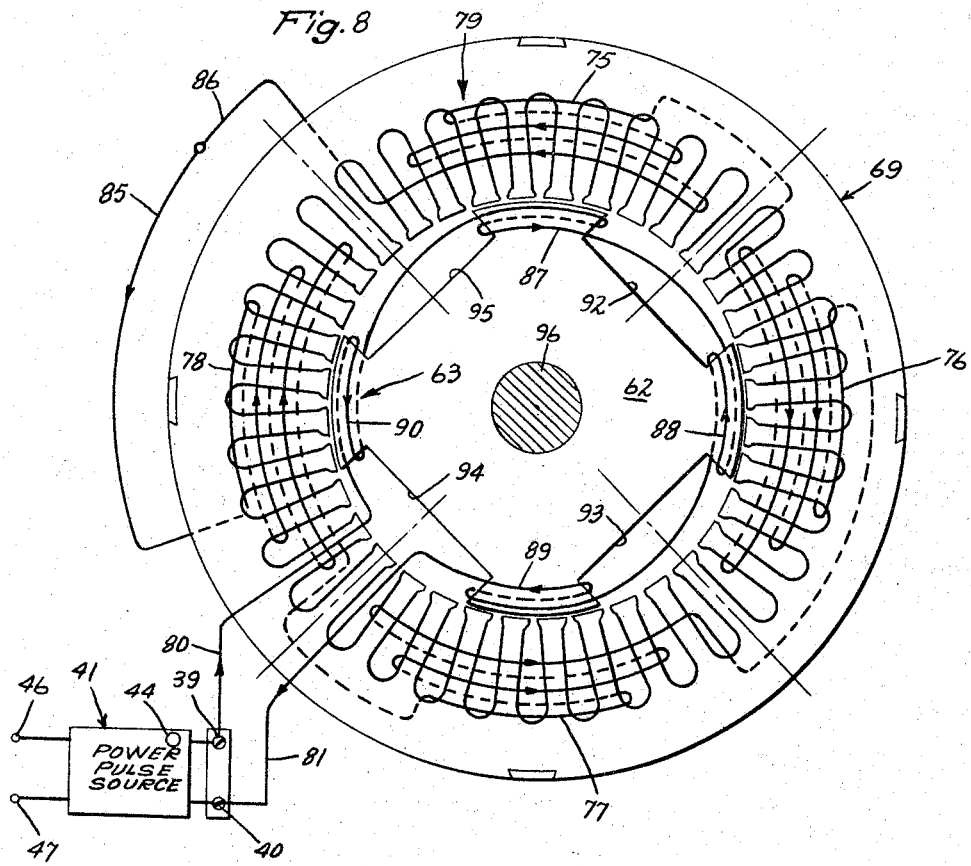
FIGURE 8 is an end view of a stator core with the coil-accommodating member and its primary winding, the excitation winding and stator winding being shown schematically to illustrate the polar relationship between the primary winding and the excitation winding.

Turning now to FIGURE 8, I have shown a schematic representation of the winding-accommodating member or fixture 62 positioned within the stator core 69 and carrying the excitation winding 79, which is also shown schematically. Each of the four coil groups 75, 76, 77 and 78 of the excitation winding 79 consist of three coils spanning four, six and eight tooth sections, respectively, of the stator core 69 and are connected in series circuit. The leads 85 and 86, that are normally connected in the motor circuit, are short-circuited to provide a closed path for current flow in the excitation winding. It will be noted from the direction of current flow through the coil groups, as shown in FIGURE 8, that all of the adjacent magnetic poles defined by the excitation winding 79 are of opposite magnetic polarity. As will be seen from the direction of the current flow through coils 87, 88, 89 and 90 of the primary winding 63, shown in FIGURE 9, adjacent poles of opposite magnetic polarity are set up by the primary winding 63 thereby to simulate the magnetic poles of the excitation winding 79.

Figure 9:
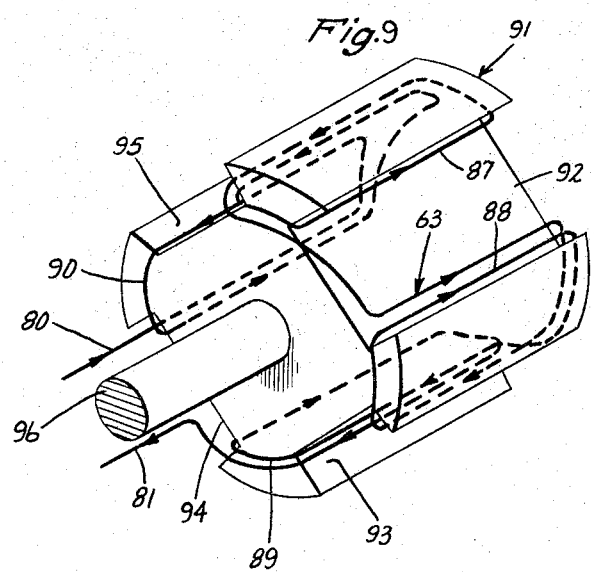
FIGURE 9 is a schematic perspective view of the primary winding and coil-accommodating member of FIGURE 8 illustrating the current flow in the coils.
Figure 10:
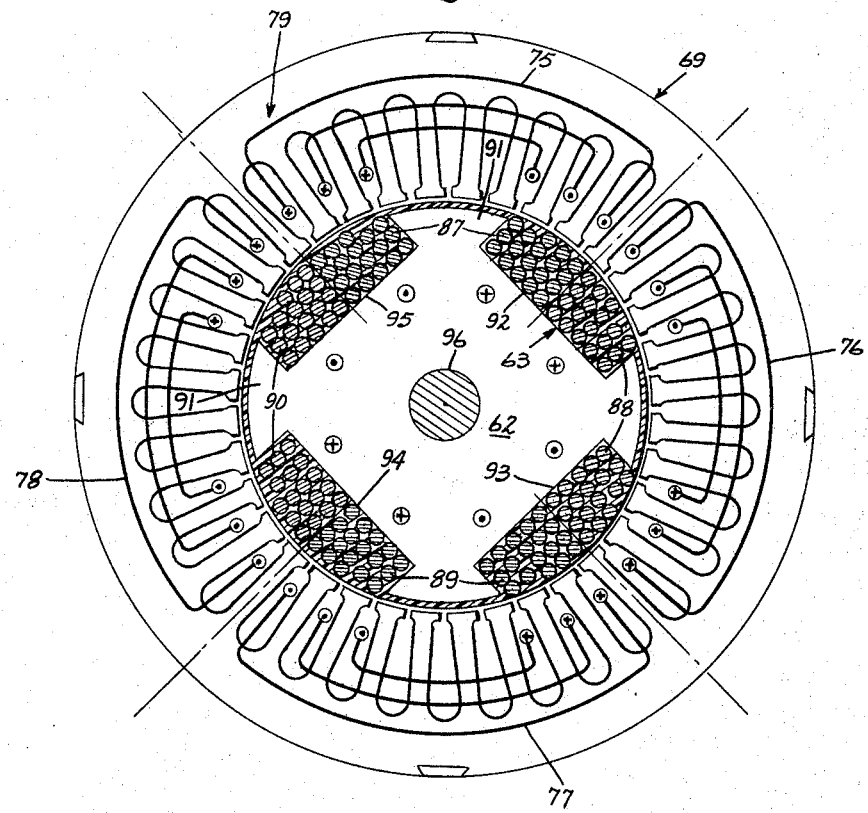
FIGURE 10 is an end view of the stator core shown in FIGURE 8 with the excitation winding illustrated schematically for the purpose of showing the current flow through the conductors of the coil side portions, an actual sectional view of the coil-accommodating member carrying the primary winding being shown.

In the schematic circuit diagram of the excitation winding 79 illustrated in FIGURE 10, the direction of current flow of conductors of the coil side portions of the excitation winding 79 and primary winding 63 is shown by the conventional symbols placed in each of the stator slots in which coil side portions are disposed. Further, I have shown in FIGURE 10 a sectionalized view of the primary winding fixture 62 as actually reduced to practice, the section being taken essentially along the plane of the end face of the winding plug 91. The winding plug 91, as used in the exemplification of my invention shown in FIGURES 5–11, was constructed of insulating resin and was formed with four slots 92, 93, 94 and 95 for accommodating the coil side portions of the primary winding 63. The winding plug 91 also included a centrally disposed stub shaft 96 for supporting the plug 91 when the coils 87, 88, 89 and 90 are inserted in the slots. After the coils 87, 88, 89 and 90 are placed in the slots 92, 93, 94 and 95, the entire assembly is encased in a cured thermosetting epoxy resin to form the cylindrically shaped primary winding member 62 (see FIGURE 5).

Figure 11:
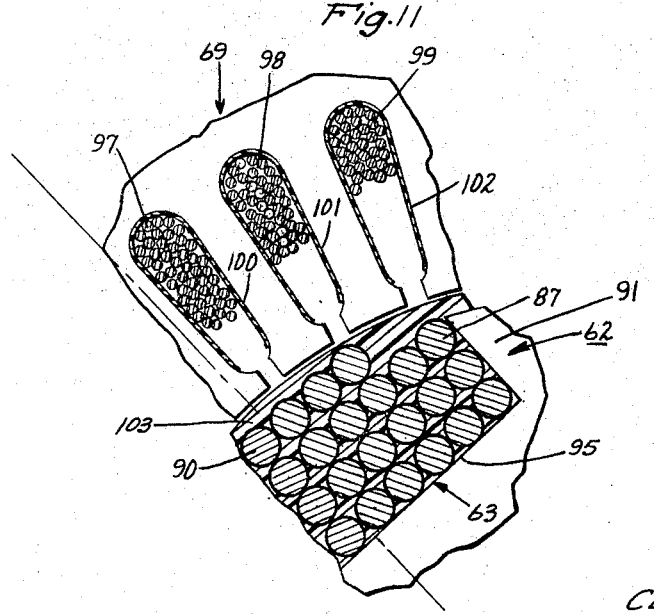
FIGURE 11 is a fragmentary view of three of the stator slots with the coil side portions sectionalized to show the push back of the slot conductors achieved in accordance with one form of the present invention.

In FIGURE 11 I have illustrated a cross section of three coil side portions 97, 98 and 99 of coil group 75 to show the compaction achieved by injecting a high power pulse in the primary winding 63. It will be noted that the conductors of the coil side portions 97, 98 and 99 are pushed back toward the bottom of the slots against the insulating slot liners 100, 101, 102 and are compacted therein. In particular, it will be noted that the coil side portions of coils 87 and 90 of the primary winding 63 are disposed side-by-side in the same slot 95 and are nonmovably held in the slots by means of the resin 103 which firmly bonds the primary winding 63 in the slots of the primary winding plug 91 and maintains the winding 63 in fixed relation relative to the stator core 69.

When a high power pulse is injected in the primary winding 63 by depressing the push button 44, a varying magnetic field is set up by the surge of current flow through the primary winding 63 and by the surge of induced current flow in the excitation winding 79. The intensity of the magnetic field is greater in the region of the extremities of the tooth sections of the stator core 69. This results in a stronger magnetic field near the slot entrances and a weaker magnetic field in the yoke section of the stator core 69. Thus, the conductors of the coil side portions 97, 98 and 99, being movably disposed in the slots, are forced back towards the bottom of the slots in the direction of the weaker magnetic field and away from the stronger field near the slot entrances. As a result, the coil side portions are effectively compacted without need for a mechanical member to come into physical contact with the coil side portions.

Although in the exemplification of the invention shown in FIGURES 8, 9 and 10, the coils 87, 88, 89 and 90 of the primary winding 63 are connected in series circuit relation, it will be appreciated that the coils can be readily connected in parallel circuit relation with each other across the connector terminals 39, 40 of the power pulse source 41. Where the coils are connected in parallel, the output voltage of the power pulse source 41 will, of course, be applied across each of the coils. Although the coil groups 75, 76, 77 and 78 of the excitation winding 79 were connected in series circuit and short-circuited, it will be understood that the coil groups can be individually short-circuited.

For the purpose of more clearly illustrating how the method and apparatus embodying one form of my invention has been satisfactorily carried out and reduced to practice, I will now more fully describe how the coil-placing operations on the excitation winding 79 illustrated in FIGURES 8 and 10 were effected by utilizing the apparatus 61 shown in FIGURES 5, 6 and 7.

Initially, a high power pulse was injected into the primary winding 63 of the fixture 62 by discharging the capacitor bank of the power pulse source 41 after it was charged to a level of 500 volts (128 joules). During the application of this initial power pulse a slight movement of the coils of the excitation winding 79 was observed. The capacitor bank of the power pulse source 41 was then charged to 1100 volts (620 joules) and discharged through the primary winding 63 to produce a second high power pulse therein. A further movement of the coils of the excitation winding 79 was observed but the coil end turn portions were not yet sufficiently pushed back. A third power pulse was then injected into the primary winding by discharging the capacitor bank after it was charged to 3000 volts (4600 joules). The coil end turn portions were pushed back away from the fixture 62 essentially as shown in FIGURE 6, and the coil side portions were compacted and pushed toward the bottom of the slots. Immediately after the coil-placing operations were effected, a 2000 volt high potential test in accordance with NEMA (National Electrical Manufacturers Association) standard MG 1–12.05 and a repetitive surge test at 3000 volts in accordance with NEMA standard MG 1–12.03 were conducted, and the results of these tests were entirely satisfactory.

By way of further illustration, the stator core 20 with the excitation winding arrangement shown in FIGURES 1 and 2 was placed on the apparatus 61 shown in FIGURES 5, 6 and 7. Four electric power pulses were successively injected into the primary winding 63 of the fixture 62. The capacitor bank was successively charged to 500, 1000, 2000 and 3000 volts to provide power pulses respectively of 128, 512, 2020 and 4600 joules. After the application of the fourth power pulse, the end turn portions of the excitation winding 34 were found to be sufficiently pushed back to meet the production standards. A 2000 volt high potential test in accordance with NEMA standard MG 1–12.03 and a 3000 volt repetitive surge test (NEMA standard MG 1–12.05) were carried out on the excitation winding 34 with satisfactory results.

Having reference now to FIGURES 12 through 16, I have shown therein an exemplification of the invention as applied to an armature 105 of a D.C. series wound motor. The polar development of the primary winding 106 of a winding accommodating member or fixture 107 and an armature winding 108 are arranged side by side to show the polar relationship between the windings 106 and 108. The primary winding 106 is arranged to provide two magnetic poles simulating the poles $N_3$ and $S_3$ of the armature winding 108, each of the coils 109 and 110 of the primary winding 106 having six turns and defining the two magnetic poles symmetrically disposed with respect to the radial axis 111. As is best seen in FIGURE 14, the primary winding 106 is embedded in the annular shaped fixture 107 formed of resin and reinforced by a helical wire 112.

It will be noted that the armature winding 108, as shown in FIGURE 12, is a lap winding wound to provide two magnetic poles $N_3$, $S_3$ with two coil sides 113 per slot 114. The eighteen coils of the armature winding 108 progress completely around the armature 105 and are connected respectively to eighteen commutator bars 115. The commutator bars 115 are short-circuited by placing a short circuiting ring 116 over the bars 115, as is shown schematically by the connection 116 in FIGURE 12 and by the ring 116 in FIGURE 13.

In order to effect the desired coil-placing operations on the armature 105, it was supported at the right end in a cradle member 118 and at the left end, as seen in FIGURE 13, by a cradle member 119. A pair of clamping elements 120 and 121 securely hold the shaft 122 against the cradle members 118 and 119 to prevent possible rotational movement of the armature 105 when a high power pulse is injected in the primary winding 106. The cradle member 118 at the right end is detachably mounted on a base plate 123 by screw 56 to permit its removal thereby to allow the armature 105 to be withdrawn from the central bore 124 of the primary winding fixture 107. To prevent the possibility of rotational movement of the fixture 107 relative to the armature 105, the fixture 107 is also secured to the base plate 123 by securing elements 125 and 126.

After the coils of the armature winding 108 are initially inserted in the armature slots 114, the conductors 127 of the coils are generally loosely distributed as is shown in FIGURE 15. After a high power pulse is injected into the primary winding 106, the conductors 127 are forced back against the slot liner 128 toward the bottom of the slot 114 as is shown in FIGURE 16. A push back from the initial position (shown in dashed outline in FIGURE 13) to the final position shown therein and a compaction of the slot conductors toward the bottom of the slots is produced by electromagnetic forces resulting from the interaction of the magnetic field and currents established by the injection of one or more high power pulses of preselected magnitudes into the primary winding 106.

Having more specific reference now to FIGURE 17, I will now more fully describe the operation of the power pulse source 41 as shown generally in FIGURES 1, 2, 5, 6, 8, 12 and 13 in block diagram form. Specific components which may be used in the illustrated power pulse source 41 are more particularly identified in my copending application Ser. No. 414,823 filed Nov. 30, 1964. In order to provide a high power pulse of preselected magnitude, a bank of three parallel-connected storage capacitors $C_1$, $C_2$ and $C_3$ is charged to a selected voltage level between 500 and 4000 volts, and the capacitor bank is then discharged by switching an ignitron $S_1$ into conduction.

The power pulse source 41 is energized through the terminals 46, 47 which are adapted for connection to a suitable alternating supply, such as 120 volt, 60 cycle commercial supply. In the actual power pulse source 41 used in the practice of the invention, the terminals 46, 47 were brought out to a three-prong plug along with a ground lead for use in conjunction with a grounded type receptacle. A main on-off switch 130 is provided to make power immediately available for certain operating components of the power pulse source 41 and to completely deenergize the pulse source 41 when not in use. When the on-off switch 130 is closed, it will be noted that the primary windings $P_3$, $P_4$ of filament transformers $T_3$, $T_4$ are immediately energized.

A bimetallic time delay switch 131 is provided to insure that plate voltage cannot be applied on rectifier tubes $D_1$, $D_2$, $D_3$ until the grids have been warmed up for at least 30 seconds. It will be seen that leads 132 and 133 which connect the power supply in circuit with the operating push button 44 are not energized until after lapse of a predetermined interval as determined by the bimetallic time delay switch 131.

Before initiating the operation of the pulse source 41, the voltage level to which the capacitor bank is charged is set by an adjustable arm 135 of control autotransformer $T_1$. The autotransformer $T_1$ controls the voltage applied across the primary $P_2$ of step-up transformer $T_2$ and thereby also controls the voltage between the center point $M_2$ and one end of the secondary winding $W_2$ of step-up transformer $T_2$. Also, the time delay control 136 is set to provide a selected delay interval before the capacitors $C_1$, $C_2$ and $C_3$ are discharged. This delay interval must be at least as long as the time required to charge the capacitors $C_1$, $C_2$ and $C_3$.

To start charging the capacitor bank, the push button 44 is depressed to actuate the relays 137, 138, 139 and thereby cause the time delay relay 140 and control autotransformer $T_1$ to be energized. With the control autotransformer $T_1$ energized, the primary winding $P_2$ of step-up transformer $T_2$ is energized, the peak current in the primary circuit being limited by a choke $L_1$.

A full wave rectified current for charging the capacitors $C_1$, $C_2$, $C_3$ is provided by a rectifier utilizing a pair of high voltage rectifiers $D_1$ and $D_2$ and a center tap secondary winding $W_2$ of step-up transformer $T_2$. The two rectifiers $D_1$ and $D_2$ alternately conduct current since, at any given instant, one plate is positive while the other is negative.

The voltmeter 82 is connected in series with a multiplier resistor $R_1$ across the capacitor bank. The voltmeter 82 provides an indication of the voltage level on the capacitor bank and permits a visual check to be made on the voltage on the capacitors $C_1$, $C_2$, $C_3$ to insure that a power pulse of the selected magnitude is supplied to the primary winding of the fixture 62.

The firing circuit for the ignitron $S_1$ includes a capacitor $C_4$ which is charged by the full-wave rectified voltage across the capacitor bank through a voltage divider consisting of resistors $R_2$ and $R_3$. During the charging period of the capacitor bank, the capacitor $C_4$ of the firing circuit is also being charged. A resistor $R_4$ connected in the discharge circuit of the capacitor $C_4$ controls its rate of discharge when it is discharged by relay 141 to fire the ignitron $S_1$.

After the capacitors $C_1$, $C_2$ and $C_3$ are charged to the selected voltage level, the time delay interval provided by the setting on the time delay relay 140 will run out, and relay 141 closes and causes capacitor $C_4$ to discharge through the starter rod 142 of the ignitron $S_1$ to force it into conduction. When the ignitron $S_1$ conducts, it causes the capacitor bank to discharge through the primary winding of fixture 62 connected across the connector terminals 39, 40.

In order to prevent reverse current flow through the capacitor bank, a second ignitron $S_2$ is connected across the connector terminals 39 and 40. When the polarity of the voltage across the connector terminals 39, 40 reverses, the voltage at the plate of the high voltage rectifier $D_3$ will be positive and rectifier $D_3$ will conduct current to apply a positive potential at the starter rod 143 of the ignitron $S_2$. The reverse current flow is thereby shunted and does not pass through the capacitor bank. A short interval after relay 141 is actuated to the closed position to discharge capacitor $C_4$, the time delay relay 140 also causes the switch 144 to momentarily open and restore the relays 137, 138 and 139 to their normally open condition.

If a second high power pulse is to be supplied to the fixture 62, the arm 135 on the control autotransformer $T_1$ is adjusted to provide the second selected voltage level on capacitors $C_1$, $C_2$ and $C_3$. If a longer time delay relay interval is required, the control 136 of the time delay relay 140 is set to provide the desired time delay interval corresponding to the second selected voltage. To initiate the operation of the pulse source 41, the push button 44 is again depressed thereby initiating the charging of the capacitor bank, and after the selected time interval the capacitor bank is discharged to provide a second high power pulse.

From the foregoing description of the methods exemplifying the invention, it will be apparent that various coil-placing operations on inductive devices such as stator cores, armatures and other coil-accommodating members can be economically and efficiently accomplished without utilizing mechanical members physically contacting the windings. Further, the coil-placing operations can be accomplished without subjecting the coils to relatively high turn-to-turn voltages because the excitation winding is short-circuited and the current therein is induced. This can be accomplished without need for special connections to be made to the windings or coils.

It will be appreciated that although in the illustrated exemplifications the principles of my invention were applied to dynamoelectric machines, the invention can be advantageously employed to carry out coil-placing operations in other electromagnetic devices and apparatus where it is necessary to move or displace windings with respect to a coil-accommodating member.

While I have shown and described various embodiments of the invention, it will be obvious to those skilled in the art that changes and modifications may be made without departing from the invention. It is therefore intended in the appended claims to cover all such changes and modifications that fall within the true spirit and scope of my invention.

What I claim as new and desire to secure by Letters Patent of the United States is:

1. A method for effecting a desired placement of coils of an excitation winding relative to a dynamoelectric machine core having angularly spaced tooth sections extending from the core to form a plurality of slots with walls accommodating side portions of the coils, said coils wound of insulated conductor wire and distributed in said slots to define an even number of poles having a predetermined polar relationship, said method comprising the steps of: supporting a primary winding in nonmovable relation with respect to the dynamoelectric machine core and in transformer relationship with the excitation winding, said primary winding defining a number of poles equal to the poles established by the excitation winding; generating at least one high electrical power pulse of preselected magnitude in the primary winding to provide a surge of current flow therein and cause a surge of induced current flow in a closed path is the excitation winding, said surges of current flow creating a magnetic field; and effecting a movement of the coils of the electrical winding toward the walls of the slots by virtue of electromagnetic forces acting thereon and resulting from an interaction of currents and magnetic field produced by said at least one power pulse.

2. A method for effecting a desired placement of the end turn and coil side portions of an excitation winding of a dynamoelectric machine core, said excitation winding arranged in slots of the dynamoelectric machine core to define an even number of magnetic poles with adjacent poles being of opposite magnetic polarity, said method comprising the steps of: supporting a primary winding nonmovably with respect to the dynamoelectric machine core and in transformer relationship with the excitation winding, said primary winding defining a number of magnetic poles equal to the number of poles in the excitation winding and having the same polar relationship as the magnetic poles of the excitation winding; injecting at least one high electrical power pulse of preselected magnitude in the primary winding to cause a surge of current flow therein and to induce a surge of current flow in a closed path in the excitation winding thereby to establish a magnetic field and cause electromagnetic forces to act on the end turn and coil side portions to effect the desired placement thereof.

3. A method for effecting a desired placement of electrical coils of a first winding relative to a magnetic core having a plurality of angularly spaced slots accommodating portions of the electrical coils, said coils distributed in said slots to provide a number of magnetic poles having a predetermined polar relationship, said method comprising the steps of: short-circuiting the first winding to provide a path for induced current flow through the electrical coils; placing a second winding in transformer relationship with the first winding; generating in the second winding at least one electrical power pulse of preselected magnitude to cause a surge of current flow through the second winding and also to induce a surge of current flow in the first winding thereby to establish a magnetic field and cause electromagnetic forces to act on portions of at least the first winding to effect the desired placement thereof.

4. A method for effecting a desired placement of at least one coil carried on a magnetic core and defining a magnetic pole, said method comprising the steps of: supporting a primary winding in nonmovable relation with respect to the magnetic core and in transformer relationship with said at least one coil in the magnetic core, said primary winding wound to define a magnetic pole essentially simulating the magnetic pole defined by said at least one coil and producing in said primary winding at least one high electrical power pulse of preselected magnitude to cause a surge of current flow therein and to induce a surge of current flow in said at least one coil thereby to establish a magnetic field and cause electromagnetic forces to act on portions of said at least one coil to effect the desired placement thereof.

5. A method for effecting a desired placement of at least portions of insulated conductors of an electrical coil movably disposed in a coil-accommodating member and defining a first magnetic pole, said method comprising the steps of: supporting a primary winding in nonmovable relation with respect to the coil-accommodating member and in transformer relationship with said coil, said primary winding defining a magnetic pole essentially simulating the first magnetic pole; producing in the primary winding at least one electrical power pulse of a magnitude preselected to provide the desired placement of the insulated conductors, said electrical power pulse causing a surge of current flow in the primary winding and also causing a surge of induced current flow in the electrical coil; and effecting the desired placement of the insulated conductors by means of the electromagnetic forces acting on the insulated conductors and resulting from an interaction of currents and magnetic field produced by said at least one electrical power pulse.

6. A method for effecting a desired placement of portions of an excitation winding disposed on a core to define an even number of magnetic poles having a predetermined polar relationship, said method comprising the steps of: short-circuiting the excitation winding to provide a closed path for induced current to flow therein; placing a nonmovably supported primary winding in transformer relationship with the excitation winding, said primary winding defining a number of magnetic poles equal to the number of magnetic poles established by the excitation winding and having the same polar relationship as the magnetic poles defined by the excitation winding; and producing at least one high electrical power pulse of preselected magnitude in the primary winding to cause a surge of current flow therein and also to induce a surge of current flow in the excitation winding thereby to establish a magnetic field and cause electro-magnetic forces to act on at least portions of the excitation winding to effect the desired placement thereof.

7. A method for compacting coil side portions of a coil group of an excitation winding of a dynamoelectric machine core formed with slots accommodating the coil side portions distributed in said slots to define a magnetic pole, said method comprising the steps of: providing a path for induced current to flow in the coil group; coupling a nonmovably supported primary winding in predetermined inductive relation with the coil group of the excitation winding; producing in the primary winding at least one electrical power pulse of preselected magnitude to cause a surge of current flow in the primary winding and also cause a surge of induced current flow in the coil group to produce a magnetic field; and compacting the coil side portions of the coil group by means of electromagnetic forces acting thereon and resulting from an interaction of currents and magnetic field produced by said at least one electrical power pulse.

8. A method for effecting a desired placement of first electrical coil means carried by a coil accommodating member, the method comprising the steps of: positioning the first electrical coil means and a supported second electrical coil means in a transformer relation, with one of the coil means being connected to provide a closed electrical path; and producing at least one electrical power pulse of preselected magnitude in the other of said coil means to cause a surge of current flow through the other of said coil means and to cause a surge of induced current flow in the one coil means thereby establishing a magnetic field and producing electro-magnetic forces to act on the first electrical coil means for effecting the desired placement thereof.

9. A method for effecting a desired compaction of at least portions of first electrical conductor means formed of a number of conductor turns movably carried by a conductor accommodating member, the method comprising the steps of: supporting a second electrical conductor means in a nonmovable adjacent relation with respect to the conductor-accommodating member and in an inductive relation with respect to said portions of electrical conductor means; injecting at least one electrical power pulse of preselected magnitude in one of said electrical conductor means, with the other of said electrical conductor means being short-circuited to create a surge of current flow in said one electrical conductor means and to induce a surge of current flow in the other of the electrical conductor means; and effecting the desired compaction of the conductor turn portions of said first electrical conductor means by electromagnetic forces acting on the conductor turns of said first electrical conductor means by virtue of an interaction of currents resulting from said at least one electrical power pulse.

References Cited
UNITED STATES PATENTS

| | | | |
|---|---|---|---|
| 2,377,175 | 5/1945 | Peer | 318—220 |
| 2,506,173 | 5/1950 | Polard | 29—205 |
| 2,691,306 | 10/1954 | Beams et al. | 310—166 |
| 2,976,907 | 3/1961 | Harvey | 153—10 |
| 3,092,165 | 6/1963 | Harvey | 153—2 |
| 3,115,857 | 12/1963 | Pfanner | 113—44 |

OTHER REFERENCES

Furth et al., Scientific American, vol. 198, February 1958, pp. 28–33.

Seely, Introduction to Electromagnetic Fields, 1958, McGraw-Hill, pp. 269–274.

Moulin, The Principles of Electromagnetism, 2nd Edition, 1950, Oxford at the Clarendon Press, pp. 234 and 235.

Crow: Design, Construction and Operating Principles of Electromagnets for Attracting Copper, Aluminum and Other Non-Ferrous Metals; 1951; The Scientific Book Publishing Co.; p. 22.

Geary: Magnetic and Electric Suspensions; 1964, SIRA Research Report R 314, pp. 61–65.

JOHN F. CAMPBELL, *Primary Examiner.*

J. L. CLINE, *Assistant Examiner.*